(12) United States Patent
Phillips (10) Patent No.: US 7,437,311 B2
(45) Date of Patent: Oct. 14, 2008

(54) IMAGE FORMING DEVICES AND MARKETING METHODS

(75) Inventor: Quintin T. Phillips, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1690 days.

(21) Appl. No.: 09/932,638

(22) Filed: Aug. 16, 2001

(65) Prior Publication Data
US 2003/0036953 A1    Feb. 20, 2003

(51) Int. Cl.
*G06Q 30/00*    (2006.01)

(52) U.S. Cl. ............................ 705/26; 705/27; 705/28; 705/14; 709/219; 347/19; 347/20; 400/76; 399/12; 358/1.1; 358/1.14; 358/1.15; 358/1.16

(58) Field of Classification Search ................ 705/26, 705/27, 28, 14; 709/219; 347/20, 19; 358/1.1, 358/1.14, 1.15, 1.16; 400/76; 399/12
See application file for complete search history.

(56) References Cited

U.S. PATENT DOCUMENTS

| | | | | |
|---|---|---|---|---|
| 5,305,199 A | * | 4/1994 | LoBiondo et al. | ............. 705/28 |
| 5,491,540 A | | 2/1996 | Hirst | |
| 5,727,135 A | * | 3/1998 | Webb et al. | ................ 358/1.14 |
| 5,956,487 A | | 9/1999 | Venkatraman et al. | |
| 6,039,430 A | * | 3/2000 | Helterline et al. | ............. 347/19 |
| 6,333,790 B1 | * | 12/2001 | Kageyama | .................. 358/1.15 |
| 6,430,711 B1 | * | 8/2002 | Sekizawa | ..................... 714/47 |
| 6,507,409 B2 | * | 1/2003 | Kawaguchi | ................. 358/1.16 |
| 6,581,092 B1 | * | 6/2003 | Motoyama et al. | .......... 709/219 |
| 6,678,068 B1 | * | 1/2004 | Richter et al. | ............. 358/1.15 |
| 6,798,997 B1 | * | 9/2004 | Hayward et al. | ............. 399/12 |
| 6,802,659 B2 | * | 10/2004 | Cremon et al. | ................ 400/76 |
| 2003/0002074 A1 | * | 1/2003 | Miyano | ..................... 358/1.15 |

OTHER PUBLICATIONS

U.S. Appl. No. 09/480,543; "Methods and Systems for Monitoring Consumable Item Lifetimes for Peripheral Units"; Robert E. Haines et al.; filed Jan. 10, 2000.
U.S. Appl. No. 09/932,237; "Articles of Manufacture and Marketing Methods"; Quintin T. Phillips et al.; filed Aug. 16, 2001; 29pps.

* cited by examiner

*Primary Examiner*—Yogesh C Garg

(57) ABSTRACT

Image forming devices and marketing methods are described. One aspect of the invention provides an image forming device including an image engine configured to use a consumable to form a hard image; a consumable interface adapted to couple with the consumable; and processing circuitry configured to: access a condition associated with an operation of the image forming device; monitor the operation of the image forming device; forward a request externally of the image forming device responsive to the monitoring indicating an occurrence of the condition; receive a message after the forwarding; and communicate the message.

22 Claims, 4 Drawing Sheets

IMAGE FORMING DEVICES AND MARKETING METHODS

FIELD OF THE INVENTION

The present invention relates to image forming devices and marketing methods.

BACKGROUND OF THE INVENTION

Computer systems and peripheral devices thereof have enjoyed increased popularity and numerous developments in recent years. The increased uses of such devices and functionality demands for devices having increased capabilities have resulted in numerous advancements. In particular, peripheral devices configured to form images, such as laser printers, have enjoyed many advancements in imaging capabilities as well as imaging quality.

Advancements in image forming devices have not been limited to internal fixed components of the devices. For example, image forming devices use consumables during the formation of hard images. Consumables have also experienced recent developments and improvements to meet demands for improved imaging. For example, image forming devices have been configured to communicate with memory devices provided upon consumables. The image forming devices are configured to communicate with the memory devices provided upon the consumables to write data thereto and to receive data therefrom. Data upon the memory devices can include information regarding the consumable as well as information regarding operations of the image forming device. The stored data is generally utilized to enhance the operation of the associated image forming device.

Businesses are increasingly looking to opportunities to market product to proper customer segments. Targeted marketing has been observed to be very effective at producing a desired impact into appropriate segments. There exists desires to improve both devices and methodologies for marketing of products to desired segments, including products related and unrelated to image forming devices, using peripheral devices including image forming devices.

SUMMARY OF THE INVENTION

The present invention relates to image forming devices and marketing methods. One aspect of the invention provides an image forming device comprising: an image engine configured to use a consumable to form a hard image; a consumable interface adapted to couple with the consumable; and processing circuitry configured to: access a condition associated with an operation of the image forming device; monitor the operation of the image forming device; forward a request externally of the image forming device responsive to the monitoring indicating an occurrence of the condition; receive a message after the forwarding; and communicate the message.

Another aspect of the invention provides a marketing method comprising: accessing a condition associated with an operation of an image forming device configured to use a consumable to form a hard image; monitoring the operation of the image forming device; communicating a request externally of the image forming device using the image forming device and responsive to the monitoring; receiving a message responsive to monitoring indicating the communicating the request; and communicating the message using the image forming device.

Yet another aspect of the invention provides a marketing method comprising: accessing a condition associated with an operation of an image forming device configured to use a consumable to form a hard image; monitoring the operation of the image forming device; communicating a request using the image forming device to a marketing system external of the image forming device responsive to the monitoring; communicating a message using the marketing device responsive to receiving the request; and communicating the message using the image forming device.

Other aspects are provided, some of which are described below. Other features and advantages of the invention will become apparent to those of ordinary skill in the art upon review of the following detailed description, claims, and drawings.

DETAILED DESCRIPTION OF PREFERRED EMBODIMENTS

Like reference numbers utilized herein correspond to like components with any significant differences therebetween being indicated by a distinguishing suffix, such as "a".

Figure 1:
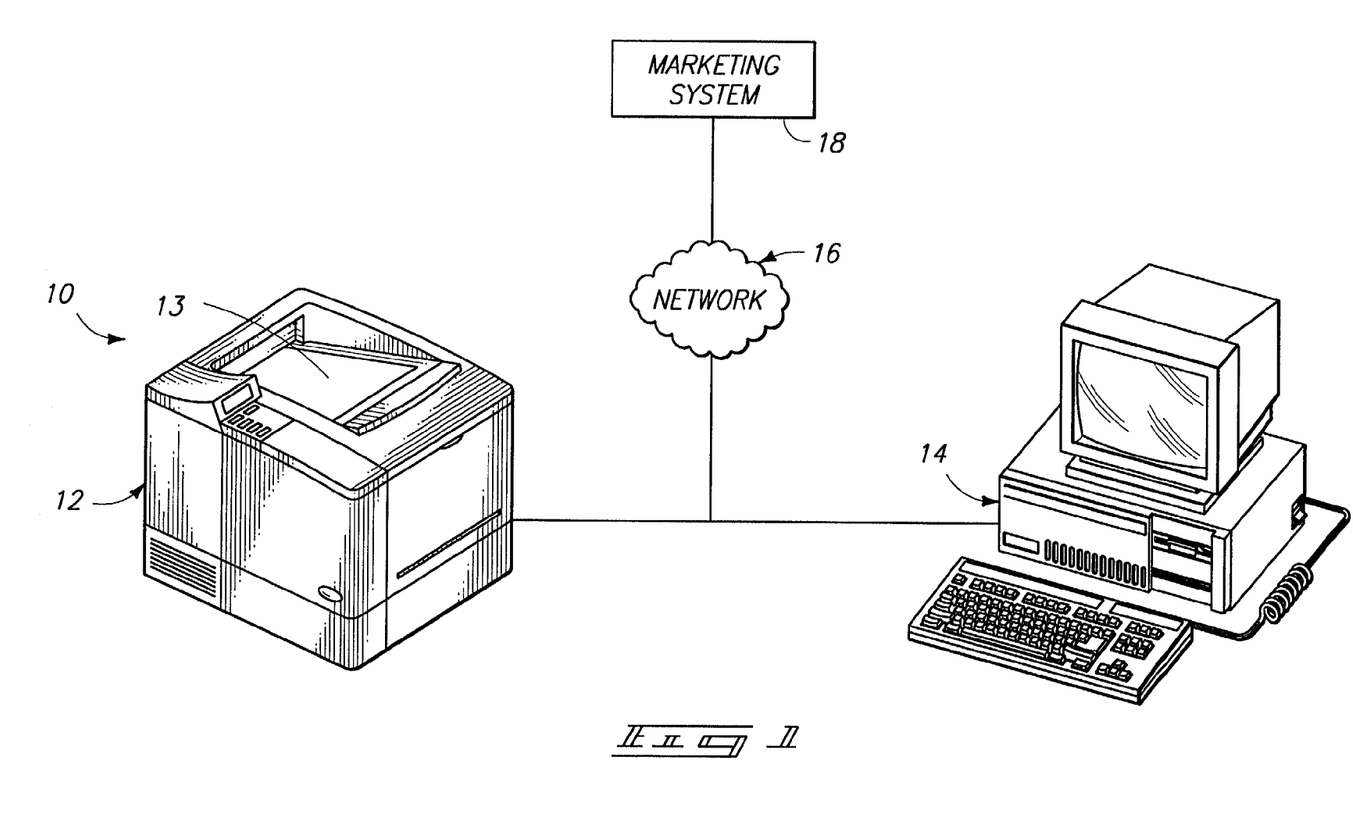
FIG. 1 is an illustrative representation of an exemplary image forming system and a marketing system.

FIG. 1 depicts an image forming system 10 including one or more image forming device 12 and one or more host device 14 (only one device 12 and one device 14 are depicted in FIG. 1). Image forming system 10 is coupled with a marketing system 18 in the depicted arrangement.

Image forming device 12, host device 14 and marketing system 18 are configured to communicate with one another using an appropriate communication medium comprising a network 16, for example. Exemplary networks 16 utilized to implement such communications include a public network (e.g., the Internet) and/or a private network. For example, image forming device 12, host device 14 and marketing system 18 are configured to implement Web communications via network 16 in one embodiment.

In typical arrangements, a plurality of image forming devices 12 and host devices 14 communicate with marketing system 18 using one or more network 16. More specifically, operations of marketing system 18 may be performed with respect to a plurality of image forming devices 12 and/or host devices 14. In addition, a plurality of image forming devices 12 and/or host devices 14 may be configured to implement operations described herein and to communicate with one or more marketing system 18 to implement such marketing operations.

Image forming device 12 is configured to utilize one or more consumable to form hard images. Exemplary consumables utilized within a given image forming device include imaging media (e.g., paper, transparencies, etc.), marking agents (e.g., toner, ink), components having fixed life spans (e.g., developer assembly) and other expendable items utilized to complete desired jobs. Aspects of the present invention provide marketing to users of image forming devices in conjunction with utilization of consumables within such image forming devices.

Exemplary image forming devices 12 include printers, facsimile devices, copiers, multiple-function devices or other devices capable of forming hard images upon media 13, such as paper, labels, transparencies, roll media, etc. Exemplary hard images include images provided upon output media comprising printed media in one example.

An exemplary host device 14 is implemented as a personal computer having an Intel™ processor or AMD™ processor (not shown). Host device 14 provides data to be imaged to image forming device 12. In addition, host device 14 may be associated with a user of image forming device 12 and/or other personnel, such as a system administrator, who monitors or otherwise accesses image forming device 12. Other host device 14 configurations are possible.

Figure 2:
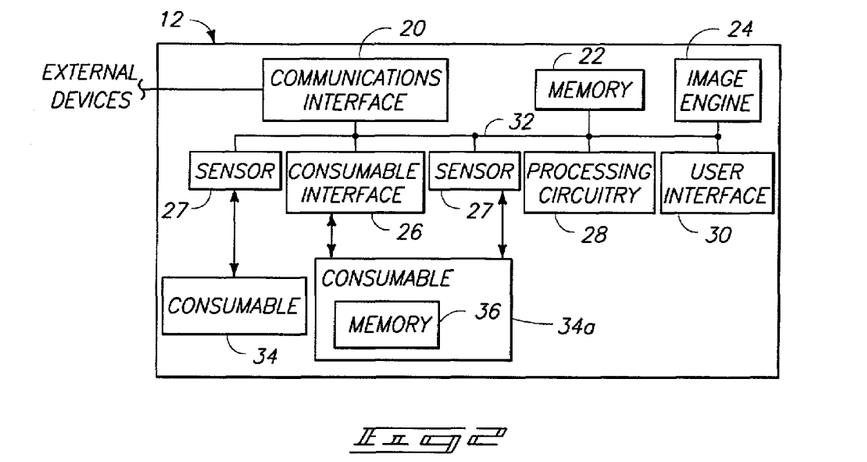
FIG. 2 is a functional block diagram of components of an exemplary image forming device.

Referring to FIG. 2, components of an exemplary image forming device 12 are illustrated. Some of the depicted components are optional and other arrangements of image forming device 12 configured to form hard images are possible. The exemplary embodiments disclosed herein are discussed with reference to a printer application although the present invention applies to any image forming device configuration capable of forming hard images.

As shown, the exemplary image forming device 12 includes a communications interface 20, a memory 22, an image engine 24, consumable interface 26, sensors 27, processing circuitry 28, a user interface 30 and a bus 32. Bus 32 is configured to implement communications intermediate the respective coupled components of image forming device 12.

Communications interface 20 is configured to couple with a communication medium, including for example network 16, to implement communications with external devices including host device 14 and marketing system 18. An exemplary communication interface 20 comprises a network interface card (NIC), modem or other configuration configured to implement external communications with respect to image forming device 12.

Memory 22 comprises computer usable media configured to store executable instructions configured to cause processing circuitry 28 to perform steps regarding marketing operations in accordance with aspects of the present invention. Memory 22 is configured to store digital information and instructions usable to control operations within image forming device 12. For example, memory 22 is configured to store image data to be imaged using image engine 24, executable instructions usable by processing circuitry 28 to implement imaging operations and to control operations of image forming device 12 including marketing operations described herein, as well as other digital data to be stored within image forming device 12. Memory 22 comprises a hard disk, floppy disk, CD ROM, random access memory (RAM), read only memory (ROM) and/or flash memory in but one exemplary embodiment. Other configurations of memory 22 are possible.

Image engine 24 implements the formation of hard images upon media 13 using one or more consumable. According to the exemplary described printer embodiment, image engine 24 is implemented as a print engine. An exemplary print engine includes a developing assembly and a fusing assembly (not shown) to respectively develop hard images using marking agents and to affix the marking agents to media 13. Other constructions or embodiments of image engine 24 are possible.

A plurality of consumables 34, 34a are depicted in the configuration of FIG. 2. Such representation is exemplary and a given image forming device 12 may include more or less consumables. Consumables 34, 34a correspond to expendable components used within image forming device 12 to form hard images. Consumable 34 corresponds to a consumable without a storage device while consumable 34a corresponds to a consumable having a storage device. The depicted storage device is configured as a memory 36, such as electronic memory configured as RAM, flash memory, or other configuration capable of storing electronic information. Other storage device configurations are possible, such as a bar code for example.

Consumable interface 26 is configured to couple with consumable 34a. For example, in one embodiment, consumable interface 26 is arranged to establish an electrical coupling for bidirectional communications of digital data with respect to consumable 34a and memory 36 thereof. Digital data may be written to or read from memory 36 via consumable interface 26. One example of consumable 34a including memory 36 is implemented as a toner cartridge containing toner for use within image forming device 12 and having memory 36 implemented as an integrated circuit. U.S. Pat. No. 5,491,540, incorporated herein by reference, discusses exemplary communications between an image forming device and a consumable. In additional embodiments, device 12 includes a plurality of interfaces 26 configured to communicate with respective memories 36 of a plurality of consumables 34a.

In one example, memory device 36 of consumable 34a is configured to electrically couple with consumable interface 26 upon insertion of consumable 34a into image forming device 12. Processing circuitry 28 reads and writes data with respect to memory 36 using consumable interface 26. As described below, memory 36 is configured to store one or more preprogrammed condition configured to control marketing operations according to aspects of the present invention. The condition(s) may or may not be related to consumable 34a or image forming device 12.

Further, memory 36 stores a plurality of lockable fields to indicate usage of consumable 34a according to additional aspects of the invention. For example, a "new" field upon memory 36 is set and locked upon manufacture of consumable 34a. Once consumable 34a is utilized in a device 12, a "used" field is set and locked upon memory 36 to indicate its used status. During operations, remaining capacity of consumable 34a may be monitored. Processing circuitry 28 sets and locks a "low" status once a low (e.g., 10% of consumable life remaining) condition of consumable 34a is detected. Further, processing circuitry 28 may set and lock an "out" field if the consumable life of the consumable 34a has been fully expended. Further details regarding usage of memory 36 and fields thereof are described below.

Sensors 27 are configured to monitor statuses of consumables 34, 34a. For example, sensors 27 monitor consumable life remaining within the respective consumables. In another embodiment, sensors 27 monitor usages of the respective consumables to determine the statuses thereof. In yet another embodiment, one or more of sensors 27 is omitted and processing circuitry 28 monitors usage of consumables (e.g., monitors number of pixels imaged to approximate usage of toner) to determine the statuses of the respective consumables. Other sensing operations or structures are possible for monitoring statuses of consumables 34, 34a.

Processing circuitry 28 is configured to execute executable instructions to control operations of image forming device 12 and to implement marketing operations described herein according to aspects of the invention. Processing circuitry 28 is configured to execute executable instructions stored within memory 22 and comprising, for example, software and/or firmware instructions. Exemplary processing circuitry 28 is implemented as a microprocessor in but one embodiment.

According to aspects of the present invention, processing circuitry 28 is configured to function in conjunction with other appropriate components of device 12 as an embedded web server configured to communicate with external devices such as host device 14 and marketing system 18 or other external devices. Exemplary embedded web server operations of an image forming device are described in U.S. Pat. No. 5,956,487, incorporated herein by reference. Other configurations for implementing external communications with respect to image forming device 12 are possible.

User interface 30 is implemented as a control panel and a display (the control panel and display are not shown) in one exemplary embodiment. A user can input commands via the control panel and processing circuitry 28 controls the display to depict status and other messages pertinent to image forming device 12.

Figure 3:
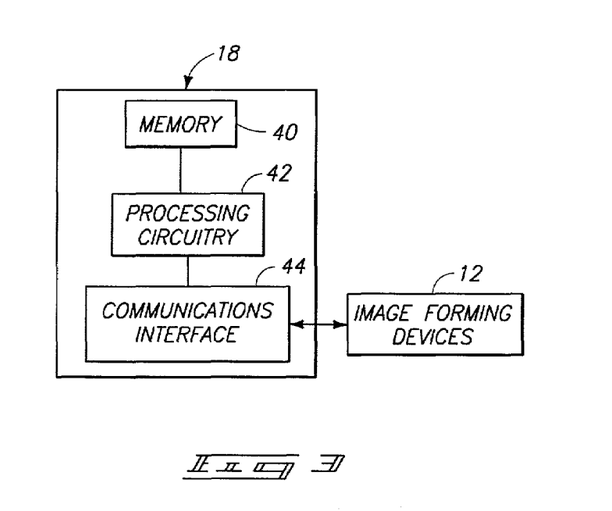
FIG. 3 is a functional block diagram of components of an exemplary marketing system.

Referring to FIG. 3, exemplary components of marketing system 18 are depicted. In the illustrated arrangement, marketing system 18 includes a memory 40, processing circuitry 42, and a communications interface 44.

Marketing system 18 may be associated with any party interested in providing marketing or making available marketing functions to users of image forming devices 12. Exemplary parties include manufacturers of consumables, suppliers of consumables, resellers of consumables, or other parties interested in implementing or making available marketing functions. The marketing functions may or may not relate to consumables or image forming devices.

Memory 40 is configured to store executable instructions configured to cause processing circuitry 42 to perform various steps, some of which are described herein. Memory 22 may be implemented in one or more of a hard disk, disk drive, random access memory (RAM), read only memory (ROM) and/or flash memory or in any other arrangement configured to store executable instructions which may be utilized by associated processing circuitry 42 or other computer. In the described embodiment, memory 40 is configured to store software and/or firmware instructions to control operations of marketing system 18.

Processing circuitry 42 is configured to access executable instructions within memory 40 and to selectively store and retrieve digital data with respect to memory 40 as desired. An exemplary configuration of processing circuitry 42 is implemented as a microprocessor, commonly available from Intel™ or AMD™. Processing circuitry 42 is configured to implement web server functions in one arrangement.

Communications interface 44 is configured to implement communications of marketing system 18 with externally located devices. An exemplary communications interface 44 is implemented as a network interface card, modem or other device capable of implementing communications between marketing system 18 and external devices. In the depicted example, communications interface 44 is configured to communicate with image forming device 12 via network 16.

Consumables 34, 34a are usable within image forming devices 12 to form hard images as described above. According to aspects of the present invention, consumables 34, 34a are usable to enable marketing functions with respect to users of such image forming devices 12 or other persons. Utilization of consumables to enable at least some of the marketing operations provides targeted marketing to users of image forming devices 12 and consumables.

As mentioned above, consumable 34a includes an appropriate storage device such as memory 36 which contains information usable by image forming device 12. For example, memory 36 contains information helpful for the image forming device 12 in understanding information relevant to the use of the associated consumable 34a within image forming device 12. Memory 36 is configured to provide information useable to obtain proper imaging quality or enhanced imaging quality, for example.

In addition, memory 36 may also record historical use information with respect to image forming device 12. Fields within memory 36 may be allocated to contain or stimulate marketing messages according to aspects of the present invention. As referred to above, memory 36 may include a field allocated to record a state of the consumable, such as "new", "used", "low" or "out". Such fields are monitored corresponding to usage of the consumable. The fields may also be locked to preserve such markings. Code configured to implement the marking and locking functions and executable by processing circuitry 28 may be stored within memory 22.

Memory 36, in some configurations, is a limited resource due to cost and complexity and accordingly space therein may also be limited. Accordingly, space upon memory 36 utilized for messages or other usages for marketing is minimized according to other aspects of the invention as described below. According to aspects of the invention, it is desired to store marketing messages in other locations such as marketing system 18 wherein space is not a concern.

In some configurations, it is desired to trigger marketing events using memory 36. For example, the setting of fields of use in memory 36 may be utilized to initiate marketing operations. In other arrangements, conditions are stored or otherwise provided upon consumable 34a and accessible by consumable interface 26 for use by processing circuitry 28 as described below. The condition may or may not relate to the associated consumable 34a. A monitored condition of device 12 may be utilized to trigger a marketing message based upon and corresponding to a stored condition of memory 36. Following an appropriate triggering event, device 12 initiates marketing operations including for example obtaining marketing messages which are thereafter communicated to appropriate users. Marketing system 18 is arranged to forward marketing messages to image forming device 12 for communication to users. Exemplary operations with respect to obtaining marketing messages are described in detail below.

According to aspects of the invention, predefined triggering events including conditions or status fields upon memory 36 initiate marketing operations of the invention. Exemplary conditions which are monitored include insertion of a new consumable, the status of the consumable being monitored (e.g., "low", "out", etc.) or other consumable conditions. Adjustment of triggering events is described in U.S. Ser. No. 09/480,543, filed Jan. 10, 2000, entitled "Methods and Systems for Monitoring Consumable Item Lifetimes for Peripheral Units", listing Robert E. Haines, Santiago Rodriguez, and Joseph L. Burquist as inventors, and incorporated herein by reference.

As mentioned above, the conditions or status fields may or may not relate to consumables 34, 34a. For example, consumable 34a may contain a condition relating to another consumable, such as consumable 34. Further alternatively, a condition to be monitored may refer to a life span of the image forming device 12. In another arrangement, a plurality of conditions are monitored corresponding to respective individual consumables 34, 34a and\ or device 12. For example, a logic table may be provided within memory 36 or memory 22 having plural conditions corresponding to one or more consumable 34, 34a and\or device 12. Once all the conditions of the logic table are satisfied, marketing operations can occur in accordance with aspects of the present invention described below.

Processing circuitry 28 monitors conditions which may be stored upon internal memory 22, memory 36 of consumable 34a or other appropriate location. Processing circuitry 28 utilizes consumable interface 26 to access conditions and status fields of memory 36 upon consumable 34a according to exemplary aspects of the present invention.

Responsive to accessing a condition from memory 22 or memory 36, processing circuitry 28 monitors one or more operation of image forming device 12 corresponding to the condition. For example, if a condition relates to a status of a consumable, processing circuitry 28 is configured to monitor the status of the consumable using the appropriate sensor 27 or by performing appropriate internal calculations.

Alternatively, processing circuitry 28 is configured to monitor a life span of image forming device 12 if the condition relates to the life span of image forming device 12. For example, processing circuitry 28 may monitor the number of new consumables provided within device 12 and after a predetermined number of consumables have been inserted as determined by the associated condition, marketing operations can occur according to the present invention. Alternatively, specific points in time, such as a specific date, or time increments, such as one or five years from date of manufacture, are utilized as exemplary conditions. These described conditions are exemplary and other conditions are possible.

If a plurality of conditions are provided upon memory 36, such as in a logic table for example, processing circuitry 28 accesses the plural conditions and monitors the conditions to trigger marketing operations according to aspects of the present invention. Once one, some or all conditions of the logic table are satisfied, marketing operations occur according to additional aspects of the present invention.

In one arrangement, image forming device 12 communicates with marketing system 18 via network 16 to implement the marketing operations. According to one aspect, and at appropriate moments in time (e.g., after at least one or all conditions are satisfied), processing circuitry 28 is configured to formulate and to forward a request externally of image forming device 12 to marketing system 18 responsive to the occurrence of one or more condition. As described further below, marketing system 18 is configured to receive the request and to reply with a desired marketing message which is communicated to image forming device 12. Image forming device 12 is configured to receive the message and to communicate the message to one or more user. For example, image forming device 12 may communicate the marketing message by imaging upon media 13 using image engine 24, communicating the message to a user using a display within user interface 30 and/or by formulating the message for communication externally via communications interface 20.

In certain arrangements of the invention, processing circuitry 28 is configured to provide an identifier of the respective image forming device 12 and/or consumable being monitored within the request. Such identifier may be utilized within marketing system 18 to extract a respective marketing message corresponding to the identifier as described further below. Other configurations are possible.

Marketing system 18 is configured to receive requests from one or more image forming device 12 using communications interface 44. Marketing system 18 is configured to reply with an appropriate message, such as a marketing message, in the form of communication of the message to the respective image forming device 12. Thereafter, subsequent communications of the message occur according to additional aspects of the invention, for example to a user.

In one exemplary arrangement, memory 40 of marketing system 18 includes a plurality of marketing messages which are appropriate for one or more image forming device or consumable. Responsive to receiving a request including an identifier, processing circuitry 42 is configured to search memory 40 using the identifier and to select at least one message according to the identifier. Exemplary identifiers include serial numbers, model numbers, and\or network addresses of image forming devices 12 and\or consumables, or any other appropriate identifier. Following selection of an appropriate message from memory 40, processing circuitry 42 is configured to communicate the message to the respective image forming device 12 using communications interface 44 and network 16. The appropriate image forming device 12 thereafter operates to communicate the received message to users of image forming device 12 if desired as described above and according to exemplary aspects of the invention.

Figure 4:
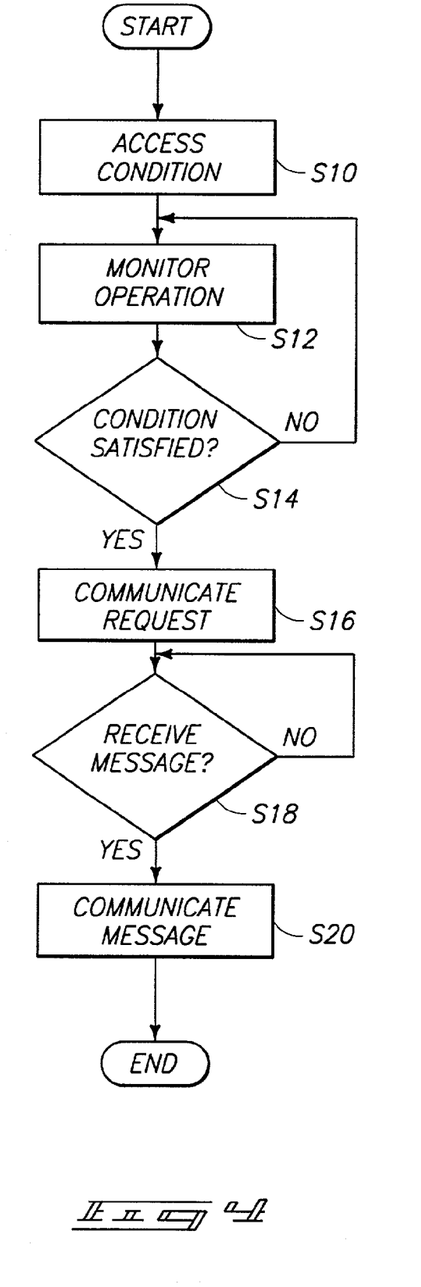
FIG. 4 is a flow chart of an exemplary methodology executable within the image forming device.
Figure 5:
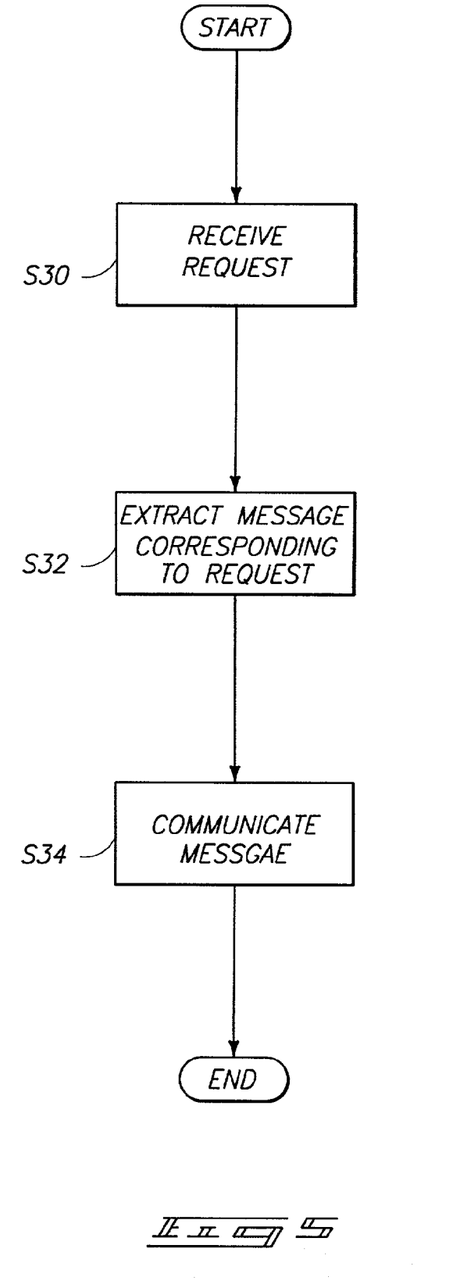
FIG. 5 is a flow chart of an exemplary methodology executable within the marketing system.
Figure 6:
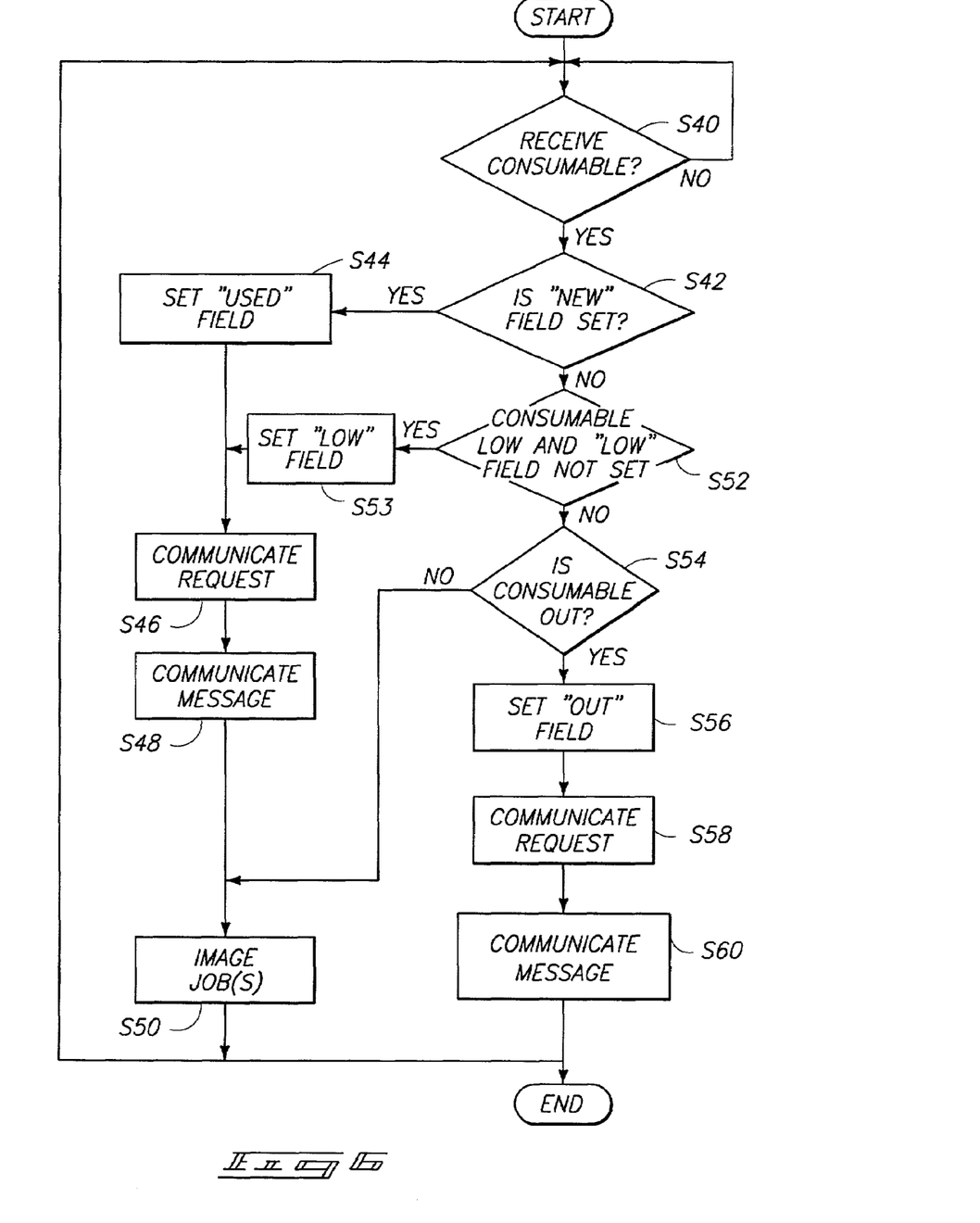
FIG. 6 is a flow chart of an exemplary methodology executable within the image forming device.

Referring to FIGS. 4-6, exemplary methodologies are depicted according to aspects of the present invention. Processing circuitry 28 of image forming device 12 is configured to execute the methodologies of FIG. 4 and FIG. 6 and processing circuitry 42 of marketing system 18 is configured to implement the methodology of FIG. 5.

FIG. 4 describes one possible method for requesting a message using device 12 and FIG. 5 depicts one possible method implemented by marketing system 18 responsive to receiving requests. FIG. 6 depicts another possible method for requesting messages using device 12. The methods of FIGS. 4 and 6 may be implemented simultaneously in a given device 12 or only one of such methods may be executed.

Other methods embodying aspects according to the invention are possible. In addition, steps depicted in FIGS. 4-6 are omitted according to other methods of the invention.

Executable instructions configured to cause the respective processing circuits 28, 42 to perform the illustrated methodologies and other methodologies to implement aspects of the present invention may be stored within appropriate computer usable medium. In accordance with aspects of the invention, processor usable code configured to cause implementation of the depicted methodologies is provided upon memory devices, 22, 40.

Referring specifically to FIG. 4, processing circuitry 28 accesses a condition from consumable 34a, memory 22 or other proper location at an appropriate moment in time, such as the insertion of consumable 34a into device 12.

Thereafter, processing circuitry 28 proceeds to a step S12 to monitor a respective operation of image forming device 12 corresponding to the accessed condition of step S10. For example, processing circuitry 28 may receive information from one or more sensors 27 corresponding to statuses of respective consumables 34, 34a and accessed conditions.

At a step S14, processing circuitry 28 determines whether the condition accessed in step S10 has been satisfied using information monitored during step S12.

If the condition of step S14 is negative, processing circuitry 28 returns to step S12.

If the condition of step S14 is affirmative, processing circuitry 28 proceeds to a step S16 to communicate an appropriate request to marketing system 18. As described above, the communicated request can also include an identifier.

Thereafter, processing circuitry 28 proceeds to a step S18 to monitor for the reception of an appropriate message responsive to communicating the request. Processing circuitry 28 idles or performs other steps during step S18 until an appropriate message is received.

At a step S20, processing circuitry 28 operates to communicate the received message to a user of image forming device 12.

Referring to FIG. 5, marketing system 18 monitors for the reception of an appropriate request from a proper image forming device 12 at a step S30 to execute the methodology of FIG. 5.

Following proper receipt of a request, processing circuitry 42 proceeds to a step S32 to select and extract an appropriate message corresponding to an identifier (if provided) within the received request. Processing circuitry 42 extracts the appropriate message from memory 40 using the identifier. Alternatively, no selection is provided and a uniform generic message is retrieved.

Thereafter, processing circuitry 42 proceeds to a step S34 to communicate the proper message to the image forming device 12 which communicated the request, or other appropriate destination.

Referring to FIG. 6, processing circuitry 28 monitors for the reception of a consumable within device 12 at a step S40 using information from consumable interface 26.

At a step S42, processing circuitry 28 accesses memory 36 of consumable 34*a* to determine whether consumable 34*a* is indicated to be in a new condition by analyzing a "new" field set within memory 36.

If the condition of step S42 is affirmative, processing circuitry 28 operates to set the "used" field upon memory 36.

At a step S46, processing circuitry 28 formulates an appropriate request for communication to marketing system 18. The request may indicate the insertion of a new consumable or other status (e.g., low consumable status after step S53) to assist with the selection of an appropriate message within system 18.

At a step S48, processing circuitry 28 communicates a received message from marketing system 18 in a desired manner responsive to the request of step S46. Processing circuitry 28 may idle or perform other operations between step S46 and step S48 while awaiting the reception of the message from marketing system 18.

At a step S50, processing circuitry 28 controls image engine 24 to image appropriate jobs.

Referring again to step S42, if the condition therein is negative, processing circuitry 28 proceeds to a step S52 to determine whether the consumable has reached a "low" status using information from sensor 27 and whether the "low" field is not set upon memory 36.

If the condition of step S52 is affirmative, processing circuitry 28 proceeds to a step S53 to set the "low" field and thereafter proceeds to step S46.

If the condition of step S52 is negative, processing circuitry 28 proceeds to a step S54 to determine whether the consumable is out using information from sensor 27.

If the condition of step S54 is negative, processing circuitry 28 proceeds to step S50.

If the condition of step S54 is affirmative, processing circuitry 28 proceeds to a step S56 to set the "out" field upon memory 36.

Processing circuitry 28 then proceeds to a step S58 to communicate an appropriate request to marketing system 18. The request can include the indicate "out" status if desired.

In a step S60, processing circuitry 28 communicates messages received from marketing system 18 responsive to the request communicated in the step S58. Processing circuitry 28 may idle or perform other steps between steps S58 and S60 while awaiting the reception of the appropriate message.

The protection sought is not to be limited to the disclosed embodiments, which are given by way of example only, but instead is to be limited only by the scope of the appended claims.

What is claimed is:

1. A marketing method comprising:
   accessing a condition associated with an operation of an image forming device configured to use a consumable to form a hard image;
   monitoring the operation of the image forming device;
   communicating a request externally of the image forming device using the image forming device and responsive to the monitoring;
   receiving a message responsive to the communicating the request; and
   communicating the message using the image forming device.

2. The method of claim 1 wherein the accessing comprises accessing the condition from the consumable.

3. The method of claim 1 wherein the accessing comprises accessing the condition related to a status of the consumable and the monitoring comprises monitoring the status of the consumable.

4. The method of claim 1 wherein the accessing comprises accessing the condition not related to a status of the consumable.

5. The method of claim 1 wherein the accessing comprises accessing the condition related to a life span of the image forming device and the monitoring comprises monitoring the life span of the image forming device.

6. The method of claim 1 wherein the accessing comprises accessing the condition related to a status of another consumable not having the condition, and the monitoring comprises monitoring the status of the another consumable.

7. The method of claim 1 wherein the accessing comprises accessing a plurality of conditions related to statuses of a plurality of consumables used by the image forming device to form the hard image, and the monitoring comprises monitoring the statuses of the consumables.

8. The method of claim 1 wherein the communicating the request comprises communicating the request including an identifier of the image forming device.

9. A marketing method comprising:
   accessing a condition associated with an operation of an image forming device configured to use a consumable to form a hard image;
   monitoring the operation of the image forming device;
   communicating a request using the image forming device to a marketing system external of the image forming device responsive to the monitoring;
   communicating a message using the marketing system responsive to receiving the request; and
   communicating the message using the image forming device.

10. The method of claim 9 wherein the accessing comprises accessing the condition from the consumable.

11. The method of claim 9 wherein the accessing comprises accessing the condition related to a status of the consumable and the monitoring comprises monitoring the status of the consumable.

12. The method of claim 9 wherein the accessing comprises accessing the condition not related to a status of the consumable.

13. The method of claim 9 wherein the accessing comprises accessing the condition related to a life span of the image forming device and the monitoring comprises monitoring the life span of the image forming device.

14. The method of claim 9 wherein the accessing comprises accessing the condition related to a status of another consumable not having the condition, and the monitoring comprises monitoring the status of the another consumable.

15. The method of claim 9 wherein the communicating the request comprises communicating the request including an identifier of the image forming device, and further comprising selecting the message from a plurality of other messages using the identifier, and wherein the communicating the message comprises communicating the message after the selecting.

16. The method of claim 1 wherein the monitoring comprises monitoring the operation of the image forming device with respect to the condition.

17. The method of claim 16 wherein the communicating the request comprises communicating responsive to the monitoring detecting the operation of the image forming device triggering the condition.

18. The method of claim 1 wherein the communicating comprises communicating the message comprising marketing information regarding purchase of an item associated with the formation of hard images.

19. The method of claim 1 wherein the communicating the message comprises printing the message upon paper.

20. The method of claim 1 wherein the communicating the message comprises displaying the message using a display of the image forming device.

21. The method of claim 9 wherein the monitoring comprises monitoring the operation of the image forming device with respect to the condition.

22. The method of claim 21 wherein the communicating the request comprises communicating responsive to the monitoring detecting the operation of the image forming device triggering the condition.

\* \* \* \* \*